US008938153B2

United States Patent
Kasutani

(10) Patent No.: US 8,938,153 B2
(45) Date of Patent: Jan. 20, 2015

(54) REPRESENTATIVE IMAGE OR REPRESENTATIVE IMAGE GROUP DISPLAY SYSTEM, REPRESENTATIVE IMAGE OR REPRESENTATIVE IMAGE GROUP DISPLAY METHOD, AND PROGRAM THEREFOR

(75) Inventor: Eiji Kasutani, Tokyo (JP)

(73) Assignee: NEC Corporation, Tokyo (JP)

( * ) Notice: Subject to any disclaimer, the term of this patent is extended or adjusted under 35 U.S.C. 154(b) by 1061 days.

(21) Appl. No.: 12/278,761

(22) PCT Filed: Feb. 7, 2007

(86) PCT No.: PCT/JP2007/052095
§ 371 (c)(1),
(2), (4) Date: Aug. 7, 2008

(87) PCT Pub. No.: WO2007/091587
PCT Pub. Date: Aug. 16, 2007

(65) Prior Publication Data
US 2009/0066838 A1 Mar. 12, 2009

(30) Foreign Application Priority Data

Feb. 8, 2006 (JP) .................................. 2006-031445

(51) Int. Cl.
*H04N 5/445* (2011.01)
*G06F 17/30* (2006.01)
(Continued)

(52) U.S. Cl.
CPC .... *G06F 17/30802* (2013.01); *G06F 17/30817* (2013.01); *G06F 17/3084* (2013.01); *G11B 27/28* (2013.01); *G11B 27/322* (2013.01)
USPC ........... 386/241; 386/230; 386/244; 386/297; 725/41; 725/43; 725/45; 725/46; 725/47

(58) Field of Classification Search
USPC ........ 386/230, 241, 244, 297; 725/39, 40, 41, 725/43, 44, 45, 46, 47
See application file for complete search history.

(56) References Cited

U.S. PATENT DOCUMENTS 5,590,262 A * 12/1996 Isadore-Barreca ........... 715/201
6,119,123 A *  9/2000 Elenbaas et al. ..................... 1/1
(Continued)

FOREIGN PATENT DOCUMENTS

| JP | 10-164471 | 6/1998 |
|---|---|---|
| JP | 10-227436 | 8/1998 |

(Continued)

OTHER PUBLICATIONS

Llang, Liuhong; Lu, Hong; Xue, Xiangyang; Tan, Yap-Peng; "Program Segmentation for TV Videos", IEEE International Symposium on Circuits and Systems, May 23-26, 2005, vol. 2, pp. 1549-1552.*

(Continued)

*Primary Examiner* — Victor Lesniewski
(74) *Attorney, Agent, or Firm* — Foley & Lardner LLP

(57) ABSTRACT

A representative image display system for selecting and displaying representative images so that a user can easily grasp contents of videos displayed in a list is provided. A video selector selects a video satisfying an input search condition. A representative image combination extractor extracts an image representing the selected video. An evaluation value calculator calculates an evaluation value of the extracted image. A representative image combination selector selects a combination of images to be displayed as representative images based on the calculated evaluation value. An output device displays the selected combination of images as the representative images.

13 Claims, 10 Drawing Sheets

(51) Int. Cl.
*G11B 27/28* (2006.01)
*G11B 27/32* (2006.01)

(56) References Cited

U.S. PATENT DOCUMENTS

| | | | | |
|---|---|---|---|---|
| 6,125,229 | A * | 9/2000 | Dimitrova et al. | 386/243 |
| 6,185,363 | B1 * | 2/2001 | Dimitrova et al. | 386/243 |
| 6,340,971 | B1 * | 1/2002 | Janse et al. | 715/721 |
| 6,697,523 | B1 * | 2/2004 | Divakaran et al. | 382/173 |
| 6,738,100 | B2 * | 5/2004 | Hampapur et al. | 348/702 |
| 6,928,233 | B1 * | 8/2005 | Walker et al. | 386/241 |
| 7,027,513 | B2 * | 4/2006 | Zhang et al. | 375/240.16 |
| 7,035,435 | B2 * | 4/2006 | Li et al. | 382/107 |
| 7,131,059 | B2 * | 10/2006 | Obrador | 715/209 |
| 7,149,413 | B2 | 12/2006 | Chotoku et al. | |
| 7,149,755 | B2 * | 12/2006 | Obrador | 1/1 |
| 7,164,846 | B2 | 1/2007 | Ohta et al. | |
| 7,184,100 | B1 * | 2/2007 | Wilf et al. | 348/700 |
| 7,245,820 | B2 * | 7/2007 | McGee et al. | 386/280 |
| 7,359,440 | B2 * | 4/2008 | Zhang et al. | 375/240.16 |
| 7,372,464 | B2 * | 5/2008 | Felt | 345/473 |
| 7,376,274 | B2 * | 5/2008 | Xiong | 382/218 |
| 7,418,192 | B2 * | 8/2008 | Gutta et al. | 386/241 |
| 7,643,657 | B2 * | 1/2010 | Dufaux et al. | 382/115 |
| 7,778,469 | B2 * | 8/2010 | Cooper et al. | 382/225 |
| 7,877,774 | B1 * | 1/2011 | Basso et al. | 725/44 |
| 8,036,263 | B2 * | 10/2011 | Wang et al. | 375/240.01 |
| 8,107,015 | B1 * | 1/2012 | Hampapur et al. | 348/700 |
| 8,307,395 | B2 * | 11/2012 | Issa et al. | 725/46 |
| 8,392,834 | B2 * | 3/2013 | Obrador | 715/723 |
| 8,576,342 | B2 * | 11/2013 | Hampapur et al. | 348/700 |
| 2001/0020981 | A1 * | 9/2001 | Jun et al. | 348/426.1 |
| 2003/0021588 | A1 * | 1/2003 | Frimout et al. | 386/95 |
| 2003/0122861 | A1 * | 7/2003 | Jun et al. | 345/720 |
| 2003/0190143 | A1 * | 10/2003 | Girgensohn et al. | 386/55 |
| 2003/0210886 | A1 * | 11/2003 | Li et al. | 386/46 |
| 2003/0212993 | A1 * | 11/2003 | Obrador | 725/9 |
| 2003/0229894 | A1 | 12/2003 | Okada et al. | |
| 2004/0128317 | A1 * | 7/2004 | Sull et al. | 707/104.1 |
| 2004/0234238 | A1 * | 11/2004 | Yoon et al. | 386/69 |
| 2005/0058431 | A1 * | 3/2005 | Jia et al. | 386/69 |
| 2005/0074168 | A1 | 4/2005 | Cooper et al. | |
| 2005/0141859 | A1 * | 6/2005 | Cheatle | 386/52 |
| 2005/0180730 | A1 * | 8/2005 | Huh et al. | 386/52 |
| 2005/0228849 | A1 * | 10/2005 | Zhang | 709/200 |
| 2006/0020597 | A1 * | 1/2006 | Keating et al. | 707/6 |
| 2006/0198603 | A1 * | 9/2006 | Yao et al. | 386/68 |
| 2006/0218617 | A1 * | 9/2006 | Bradstreet et al. | 725/135 |

FOREIGN PATENT DOCUMENTS

| | | |
|---|---|---|
| JP | 11-242542 | 9/1999 |
| JP | 2002-027400 A | 1/2002 |
| JP | 2002-027410 A | 1/2002 |
| JP | 2002-027411 A | 1/2002 |
| JP | 2003-099780 A | 4/2003 |
| JP | 2004-072727 A | 3/2004 |
| JP | 2004-328577 A | 11/2004 |
| JP | 2005-094756 A | 4/2005 |
| JP | 2005-115952 A | 4/2005 |
| JP | 2005-209123 A | 8/2005 |
| JP | 2005-151085 A | 9/2005 |
| JP | 2005-259027 A | 9/2005 |
| JP | 2005-324507 A | 11/2005 |
| JP | 2007-006129 A | 1/2007 |

OTHER PUBLICATIONS

Cooper, Matthew; Foote, Jonathan; "Discriminative Techniques for Keyframe Selection", IEEE International Conference on Multimedia and Expo, Jul. 6-8, 2005, 4 pages.*

Yuan, Yu; Feng, David; Zhong, Yuzhuo; "A Novel Method of Keyframe Setting in Video Coding: Fast Adaptive Dynamic Keyframe Selecting", International Conference on Computer Networks and Mobile Computing, Oct. 20-23, 2003, pp. 428-431.*

M. Bober, "MPEG-7 Visual Shape Descriptors," IEEE Transactions on Circuits and Systems for Video Technology, vol. 11:6, Jun. 2001, pp. 716-719.

B.S. Manjunath et al., "Color and Texture Descriptors," IEEE Transactions on Circuits and Systems for Video Technology, vol. 11:6, Jun. 2001, pp. 703-715.

Y. Miyabe et al., "Identifying a cross-document relation between sentences," Information Processing Society of Japan (IPSJ), Special Interest Group of Natural Language Processing, Jul. 2005, pp. 35-42.

* cited by examiner

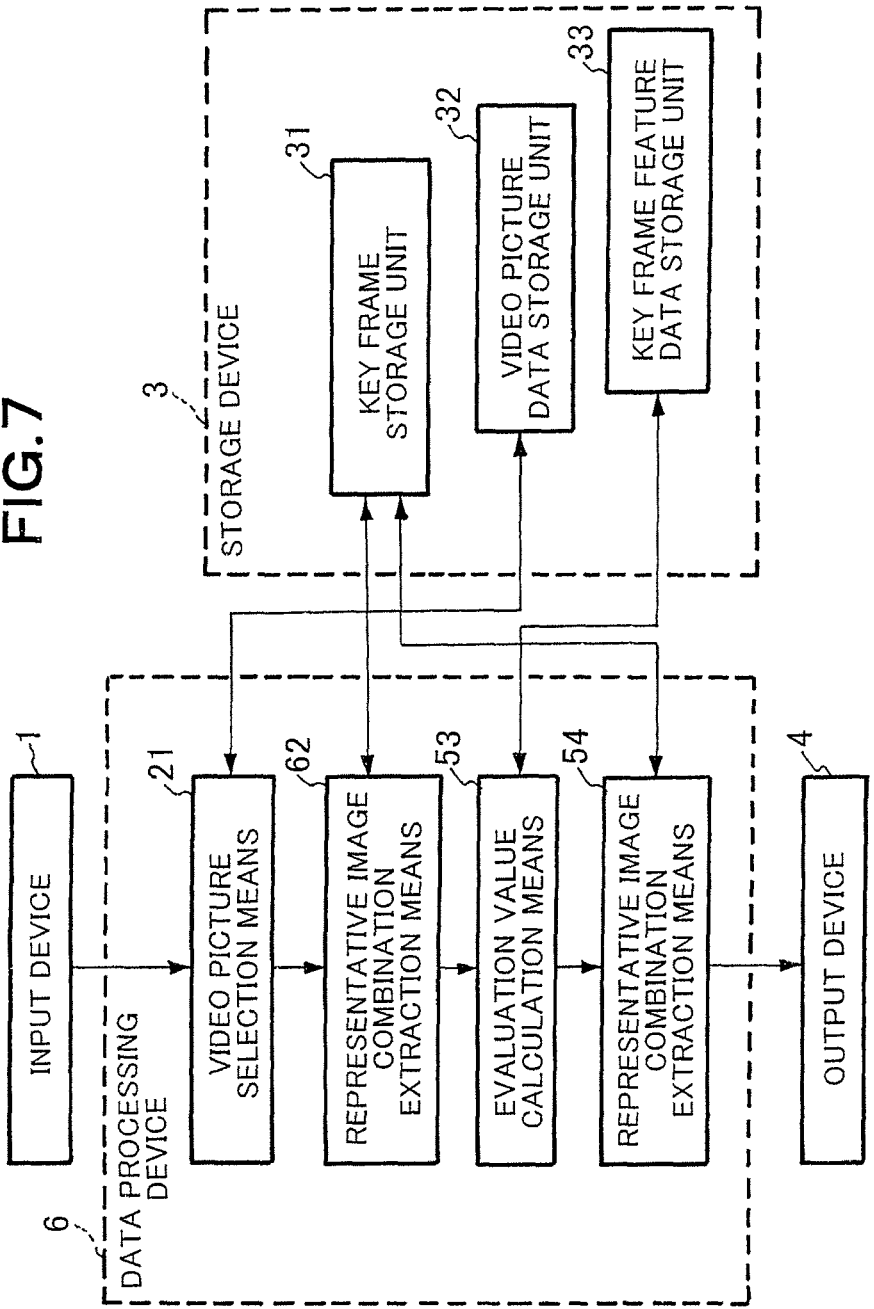

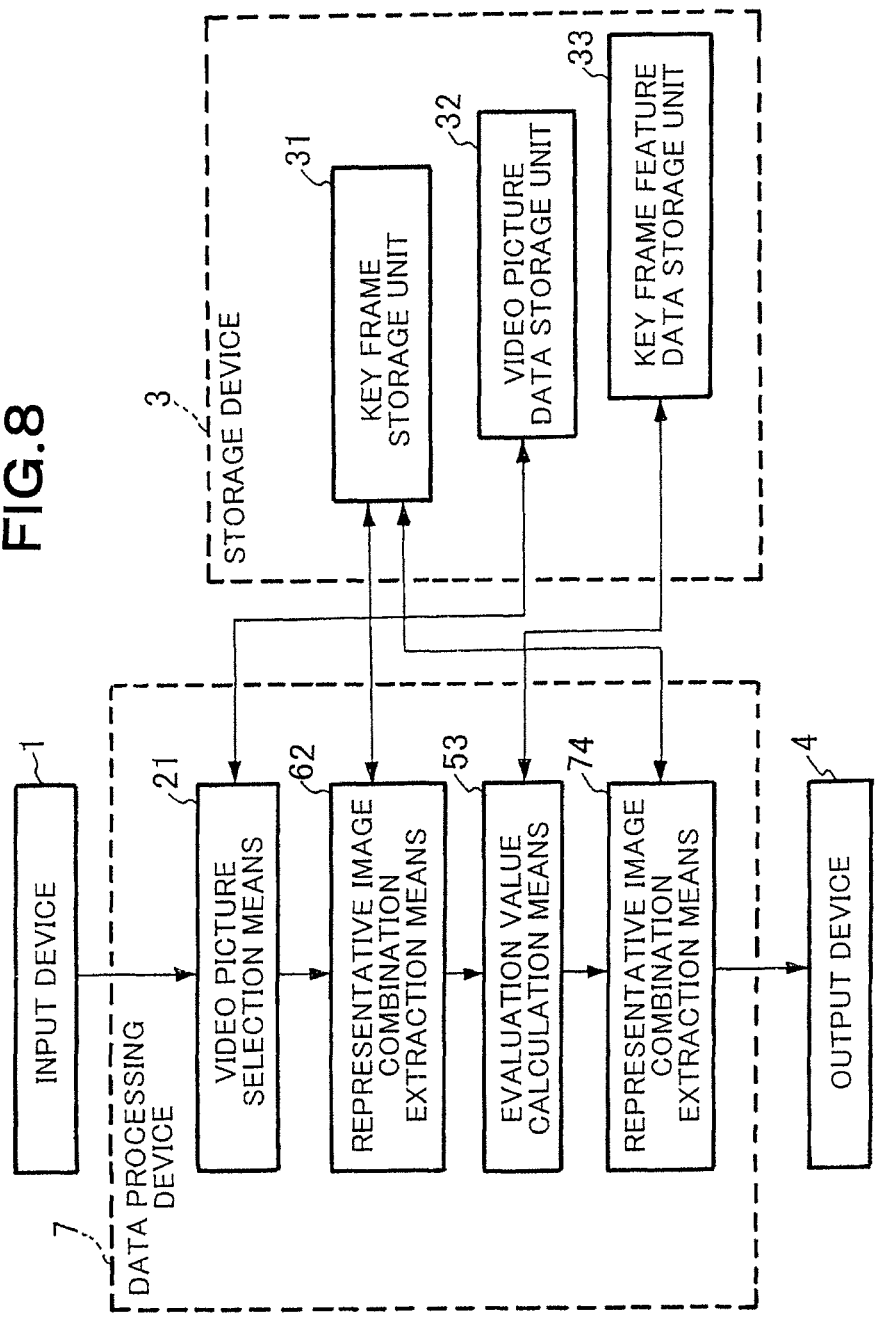

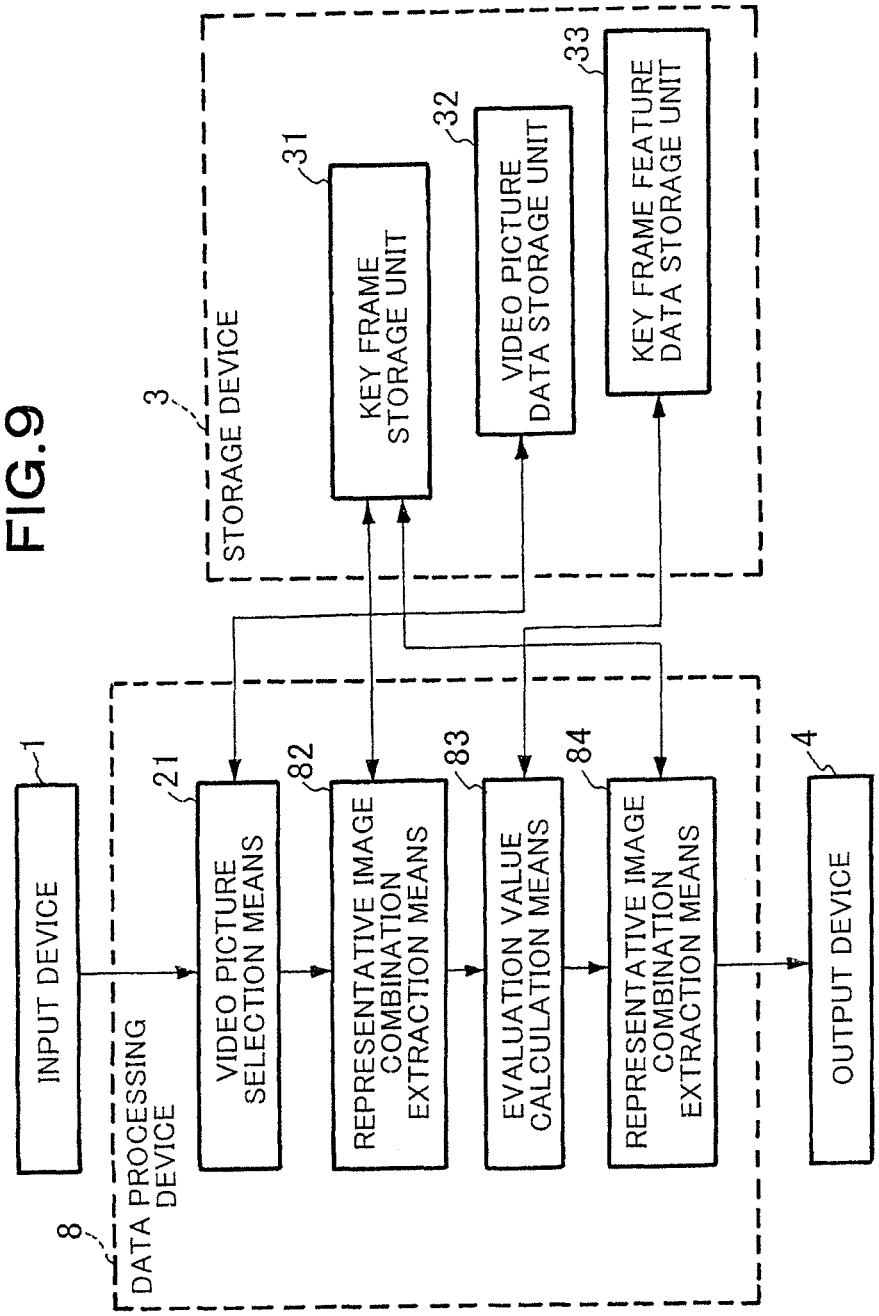

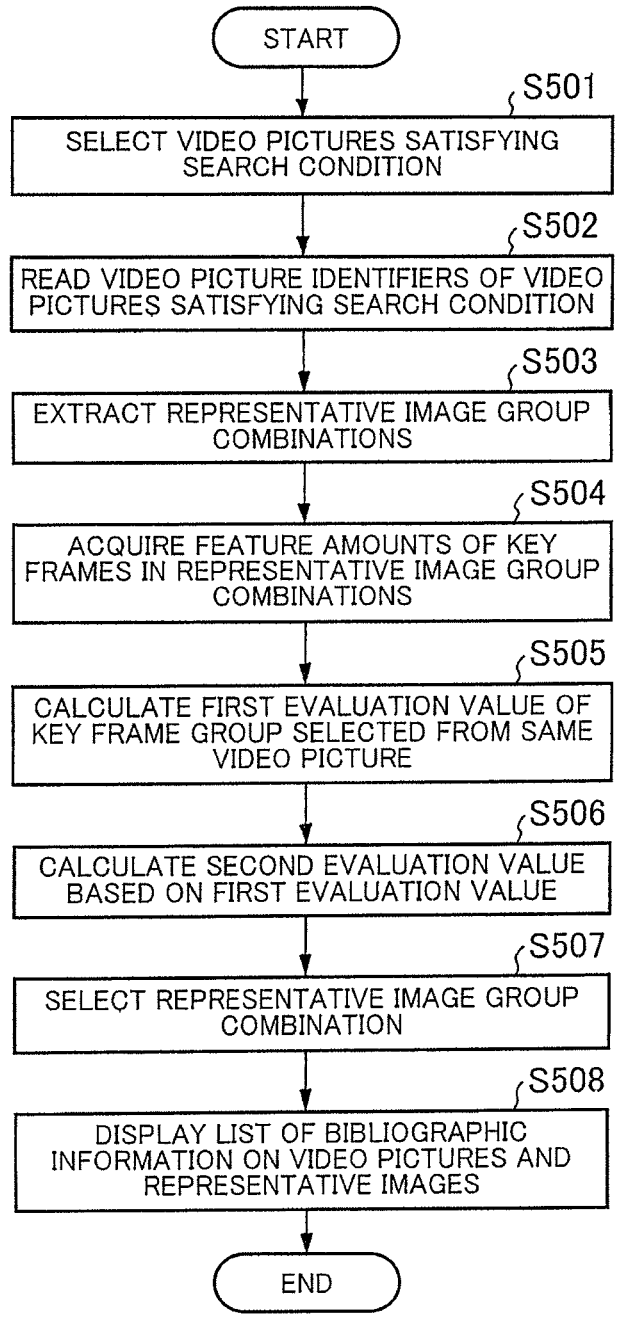

REPRESENTATIVE IMAGE OR REPRESENTATIVE IMAGE GROUP DISPLAY SYSTEM, REPRESENTATIVE IMAGE OR REPRESENTATIVE IMAGE GROUP DISPLAY METHOD, AND PROGRAM THEREFOR

This application is a national stage of International application number PCT/JP2007/052095, filed on Feb. 7, 2007, which claims priority to Japanese application number 2006-031445, filed Feb. 8, 2006, all of which are incorporated herein by reference in their entirety.

TECHNICAL FIELD

The present invention relates to a representative image or representative image group display system, a representative image or representative image group display method, a representative image or representative image group display program, and a representative image or representative image group selection system, a representative image or representative image group selection method and a representative image or representative image group selection program. More specifically, the present invention relates to a representative image or representative image group display system, a representative image or representative image group display method and representative image or representative image group display program, and a representative image or representative image group selection system, a representative image or representative image group selection method and a representative image or representative image group selection method and a representative image or representative image group selection program for deciding images displayed in a list as a representative image of each video.

BACKGROUND ART

With a view of grasping contents of videos recorded in a recording medium or supporting a user who is to select or search a desired video, images that are extracted from a plurality of videos recorded in the recording medium and that are representative images representing the contents of the respective videos are often displayed together with titles in a list.

Examples of the representative images include a frame at timing at which a video scene changes and a frame in which a person or persons appear.

Patent Document 1 describes a method of displaying representative images prepared for a plurality of videos if specific frames are prepared in advance as the representative images and a request to display a list of the videos recorded in a recording medium is issued.

Each of Patent Documents 2 and 3 describes a method of extracting an image representing one moving image from a frame constituting the moving image.

Non-Patent Document 1 describes a feature extraction method for a color feature and a texture feature and a distance calculation method.

Non-Patent Document 2 describes a shape feature.

Non-Patent Document 3 describes in Chapter 3.2 a cosine similarity used as a similarity calculation method for a similarity between two keywords or texts if features of the comparison targets are both text data.

Patent Document 1: JP-A-2002-27410 (Paragraphs 0017 to 0060; FIG. 1)

Patent Document 2: JP-A-2005-209123 (Paragraphs 0040 to 0143; FIG. 1)

Patent Document 3: JP-A-2005-94756 (Paragraphs 0006 to 0035; FIG. 1)

Non-Patent Document 1: B. S. Manjuath and three others, "Color and Texture Descriptors", (US), IEEE Transactions of Circuits and Systems for Video Technology, June 2001, Volume 11, Number 6, pp. 703-715

Non-Patent Document 2: Miroslaw Bober, "MPEG-7 Visual Shape Descriptors", (US), IEEE Transactions of Circuits and Systems for Video Technology, June 2001, Volume 11, Number 6, pp. 716-719

Non-Patent Document 3: MIYABE Yasunari, TAKAMURA Daiya, and OKUMURA Manabu, "Method of Identifying Sentence Relation among Different Documents", Information Processing Society of Japan (IPSJ), Special Interest Group of Natural Language Processing (IPSJ-SIGNL), July 2005, 2005-NL-169, pp. 35-42.

DISCLOSURE OF THE INVENTION

Problems to be Solved by the Invention

The method described in the Patent Document 1 has, however, the following problem. Specific frames decided for the videos are always displayed as the representative images, respectively. Due to this, it is difficult to grasp contents of the videos if the representative images are not arranged at appropriate positions at the time of displaying the list of the representative images for the plural videos.

Particularly if a plurality of videos using same images (frame) as a start frame and a lead image is set as a representative image for each of the videos, all the videos are identical in representative image. In that case, a user is unable to discern any difference among the videos only by viewing the representative images of the respective video images. Due to this, it is disadvantageously difficult for the user to select a desired video.

Furthermore, if a list of representative images of many videos is displayed, the user has trouble locating videos belonging to a desired category only by viewing the representative images. Due to this, the methods described in the Patent Documents 1, 2, and 3 have a problem of casting a heavy burden on every user to search a desired video from a list of representative images.

It is, therefore, an object of the present invention to provide a representative image display system, a representative image group display system, a representative image display method, a representative image group display method, a representative image display program, and a representative image group display program, and a representative image selection system, a representative image group selection system, a representative image selection method, a representative image group selection method, a representative image selection program and a representative image group selection program for selecting and displaying a representative image so that a user can easily grasp contents of videos displayed in a list.

Means for Solving the Problems

A representative image display system according to the present invention is a representative image display system including: evaluation value calculator for calculating an evaluation value of a combination of one of more representative images representing each of videos in a video group displayed in a list for each of videos; representative image combination selector for selecting a combination of the representative images displayed in the list based on the evaluation value from among the representative images; and display controller for displaying the combination of the images selected by the representative image combination selector, wherein the representative image combination selector selects the combination of the representative images according to the selection standard designated from a plurality of selection standards.

A representative image selection system according to the present invention is a representative image selection system including: evaluation value calculator for calculating an evaluation value of a combination of one of more representative images representing each of videos in a video group displayed in a list for each of videos; and representative image combination selector for selecting a combination of the representative images displayed in the list based on the evaluation value from among the representative images, wherein the representative image combination selector selects the combination of the representative images according to the selection standard designated from a plurality of selection standards.

In the representative image selection system, the representative image combination selector may select a combination of the representative images based on a selection standard so that the evaluation value of the combination of the representative images is a minimum value.

In the representative image selection system, the representative image combination selector may select a combination of the representative images based on a selection standard so that the evaluation value of the combination of the representative images is a maximum value.

In the representative image selection system, the evaluation value calculator may calculate the evaluation value based on features of the representative images.

According to the present invention, there is provided a representative image selection method including: an evaluation value calculation step of calculating an evaluation value of a combination of one of more representative images representing each of videos in a video group displayed in a list for each of videos; and a representative image combination selection step of selecting a combination of the representative images displayed in the list based on the evaluation value from among the representative images, wherein in the representative image combination selection step, the combination of the representative images is selected according to the selection standard designated from a plurality of selection standards.

In the representative image selection method, in the representative image combination selection step, a combination of the representative images based on a selection standard so that the evaluation value of the combination of the representative images is a minimum value may be selected.

In the representative image selection method, in the representative image combination selection step, a combination of the representative images based on a selection standard so that the evaluation value of the combination of the representative images is a maximum value may be selected.

In the representative image selection method, in the evaluation value calculation step, the evaluation value may be calculated based on features of the representative images.

According to the present invention, there is provided a program for causing a computer to function as a representative image selection system including: evaluation value calculator for calculating an evaluation value of a combination of one of more representative images representing each of videos in a video group displayed in a list for each of videos; and representative image combination selector for selecting a combination of the representative images displayed in the list based on the evaluation value from among the representative images, wherein the representative image combination selector selects the combination of the representative images according to the selection standard designated from a plurality of selection standards.

In the program, the representative image combination selector may select a combination of the representative images based on a selection standard so that the evaluation value of the combination of the representative images is a minimum value.

In the program, the representative image combination selector may select a combination of the representative images based on a selection standard so that the evaluation value of the combination of the representative images is a maximum value.

In the program, the evaluation value calculator may calculate the evaluation value based on features of the representative images.

In the evaluation value calculation step, the evaluation value calculation means may calculate the first evaluation value based on features of the images representing each of the designated videos.

In the evaluation value calculation step, the evaluation value calculation means may select first evaluation values of the combinations of images for the videos, respectively, and calculate a value of a sum of the selected first evaluation values as the second evaluation value.

In the evaluation value calculation step, the evaluation value calculation means may calculate the correlation between images adjacent to each other when the display means displays the images and representing each of the videos as the second evaluation value by a preset calculation method.

A representative image display program according to the present invention is a representative image display program for displaying an image representing a designated video among a video group recorded in a recording medium, causing a computer to execute: an evaluation value calculation processing for calculating an evaluation value of a combination of images representing each of designated videos and stored in image storage means for storing at least one image representing each of videos recorded in the recording medium; a representative image combination selection processing for selecting the images representing each of the designated videos from among images stored in the image storage means one by one based on the evaluation value calculated in the evaluation value calculation processing; and a display processing for causing display means to display the images selected in the representative image combination selection processing.

The representative image display program may cause the computer to: calculate, in the evaluation value calculation processing, a distribution of features of the images representing each of the designated videos and stored in the image storage means as the evaluation value, and select, in the representative image combination selection, the images representing each of the designated videos one by one from among the images stored in the image storage means based on the distribution of the features of the images calculated in the evaluation value calculation processing.

The representative image display program may cause the computer to: calculate, in the evaluation value calculation processing, the evaluation value based on the features of a combination of images representing each of the designated videos, and select, in the representative image combination selection processing, a combination of images for which the evaluation value calculated in the evaluation value calculation processing is a minimum value or a combination of images for which the evaluation value calculated in the evaluation value calculation processing is a maximum value.

A representative image display program according to the present invention is a representative image group display program for displaying an image representing a designated video among a video group recorded in a recording medium, causing a computer to execute: an evaluation value calculation processing for calculating an evaluation value of a combination of images representing each of designated videos and stored in image storage means for storing a plurality of images representing each of videos recorded in the recording medium; a representative image group combination selection processing for selecting the plurality of images representing each of the designated videos from among images stored in the image storage means based on the evaluation value calculated in the evaluation value calculation processing; and a display processing for causing display means to display the images selected in the representative image group combination selection processing.

The representative image group display program may cause the computer to: calculate, in the evaluation value calculation processing, a first evaluation value indicating a correlation of the combination of images representing one identical video by a preset calculation method, and a second evaluation value indicating a correlation of the combination of images representing another video by a preset calculation method, and decide, in the representative image group combination selection processing, the images to be selected based on the first evaluation value and the second evaluation value calculated in the evaluation value calculation processing.

The representative image group display program may cause the computer to: calculate, in the evaluation value calculation processing, the first evaluation value based on features of the images representing each of the designated videos.

The representative image group display program may cause the computer to: select, in the evaluation value calculation processing, first evaluation values of the combinations of images for the videos, respectively, and calculate a value of a sum of the selected first evaluation values as the second evaluation value.

The representative image group display program may cause the computer to: calculate, in the evaluation value calculation processing, the correlation between images adjacent to each other when the display means displays the images and representing each of the videos as the second evaluation value by a preset calculation method.

Effect of the Invention

According to the present invention, images to be displayed in a list are decided according to the images representing the designated videos, respectively. The user can, therefore, easily grasp contents of a plurality of videos and easily select a desired video.

If the representative image combination selector is configured to select a combination of images for which the evaluation value calculated by the evaluation value calculator based on the features of the images is a minimum value, the images the similarities of which are emphasized are selected as images representing the video in the same category. The user can, therefore, easily locate a video belonging to a specific category.

If the representative image combination selector is configured to select a combination of images for which the evaluation value calculated by the evaluation value calculator based on the features of the images is a maximum value, the images for which differences of the designated videos are emphasized are selected. The user can, therefore, easily locate a video.

If the representative image group combination selector decides the images to be selected based on the first evaluation value and the second evaluation value calculated by the evaluation value calculator, images the similarities of which to the other images representing the designated video are high, respectively and the differences of which from the images representing the other video are emphasized are selected. The user can, therefore, easily locate a specific video.

If the evaluation value calculator is configured to calculate the correlation between images adjacent to each other when the displays the images and representing each of the videos by the preset calculation method as the second evaluation value, it is possible to cause the unit to display images differences of which from the adjacent images are great at the time of displaying a list.

BRIEF DESCRIPTION OF THE DRAWINGS

FIG. 7 is a block diagram showing an example of a configuration of a representative image display system according to a third embodiment;

FIG. 8 is a block diagram showing an example of a configuration of a representative image display system according to a fourth embodiment;

FIG. 9 is a block diagram showing an example of a configuration of a representative image group display system according to a fifth embodiment; and FIG. 10 is a flowchart explaining operation according to the third embodiment.

DESCRIPTION OF REFERENCE SYMBOLS

Figure 1:
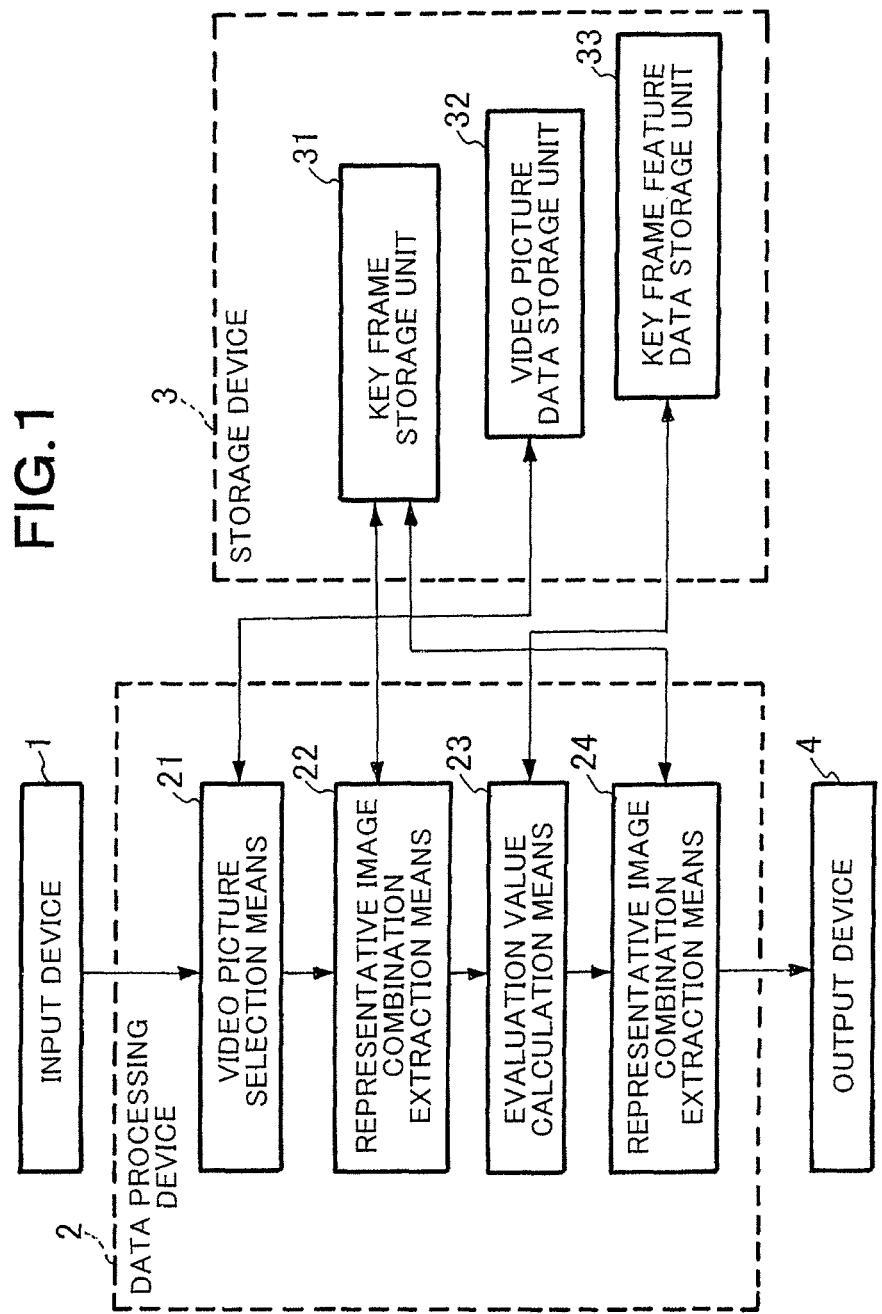
FIG. 1 is a block diagram showing an example of a configuration of a representative image display system according to a first embodiment.

1 Input device
2, 5, 6, 7, 8 Data processing device
3 Storage device
4 Output device
21 Video selector
22, 62 Representative image combination extractor
23, 53, 83 Evaluation value calculator
24, 54, 74 Representative image combination selector
31 Key frame storage unit
32 Video data storage unit
33 Key frame feature data storage unit
82 Representative image group combination extractor
84 Representative image group combination selector

BEST MODE FOR CARRYING OUT THE INVENTION

First Embodiment

A first embodiment of the present invention will be described with reference to the drawings. FIG. 1 is a block diagram showing an example of a configuration of a representative image display system according to the first embodiment of the present invention.

The representative image display system according to the present invention includes an input device 1 to which a user inputs an instruction, a data processing device 2 operating under program control, a storage device 3 storing information, and an output device (display means) 4 outputting information.

The input device 1 includes input devices such as a keyboard, a keypad, and a pointing device. Designation of a video search condition and various instructions are input to the input device 1. The designation of the picture search condition is designation of, for example, search of a video, rearrangement of videos, and narrow-down of videos based on a keyword, a data, a genre or the like.

The output device 4 is realized by, for example, a display device or a printer device. The output device 4 displays information including a representative image and provides a graphical user interface in cooperation with the input device 1.

The storage device (image storage means) 3 includes a key frame storage unit 31, a video data storage unit 32, and a key frame feature data storage unit 33.

The key frame storage unit 31 stores c (where c is a positive integer) images representing each video (hereinafter, "key frame", and a set of key frames will be referred to as "key frame group") and a unique identifier allocated to each video (hereinafter, "video identifier"). The key frame storage unit 31 may store each video and time position information indicating time of a key frame in each video instead of storing the key frame extracted from each video.

Examples of the key frame include images at timing of a change of scenes in each video, images including each person appearing in the video, images including a specific shape, and images having a high appearance frequency. Alternatively, all frames may be used as key frames instead of using a part of frames as key frames.

In another alternative, separately prepared key frames may be used instead of those extracted from the respective videos. For example, a video producer may prepare one or a plurality of frames which he or she considers to be the most important. The method of separately preparing key frames is not limited to the method of allowing the video producer to prepare key frames. For example, key frames may be automatically selected by video analysis, a third party may manually select and prepare key frames or images obtained from outside may be defined as key frames.

The video data storage unit 32 stores bibliographic information indicating a title, a genre, a date and the like of each video and the video identifier allocated to each video.

The key frame feature data storage unit 33 stores a feature of each key frame as well as the identifier allocated to each key frame. The feature is one of or both of a physical feature extracted from each key frame and text data describing a content of the key frame. The physical feature is, for example, one of or a combination of a color, a pattern (texture), and a shape.

A method of extracting a color feature and a texture feature and a distance calculation method are described in the Non-Patent Document 1. A method of extracting a shape feature is described in the Non-Patent Document 2.

A cosine similarity used in a method of calculating a similarity between keywords or texts if features of two comparison target key frames are both text data is described in Chapter 3.2 of the Non-Patent Document 3.

As a method of calculating a distance between key frames to be described later, a method described in, for example, each of the Non-Patent Documents 1 to 3 is used. If the feature of a key frame is a combination of the physical feature and the text data feature, a distance between key frames is calculated by subjecting a similarity between physical features and that between text data features to weighted addition.

The data processing device 2 includes a video selector 21, a representative image combination extractor 22, an evaluation value calculator 23, and a representative image combination selector means 24.

The video selector 21 searches the bibliographic information stored in the video data storage unit 32 and selects a video satisfying the search condition input to the input device 1. Specifically, if the video search condition for search of a video, rearrangement of videos, and narrow-down of videos based on a keyword, a data, a genre or the like is input, the video selector 21 acquires video identifiers of videos satisfying the input video search condition. Key frames of the videos satisfying the condition are listing presentation candidates.

The representative image combination extractor 22 selects and extracts a key frame of each of the video corresponding to the video identifier acquired by the video selector 21 from the key frame group stored in the key frame storage unit 31 one for every video.

Figure 2:
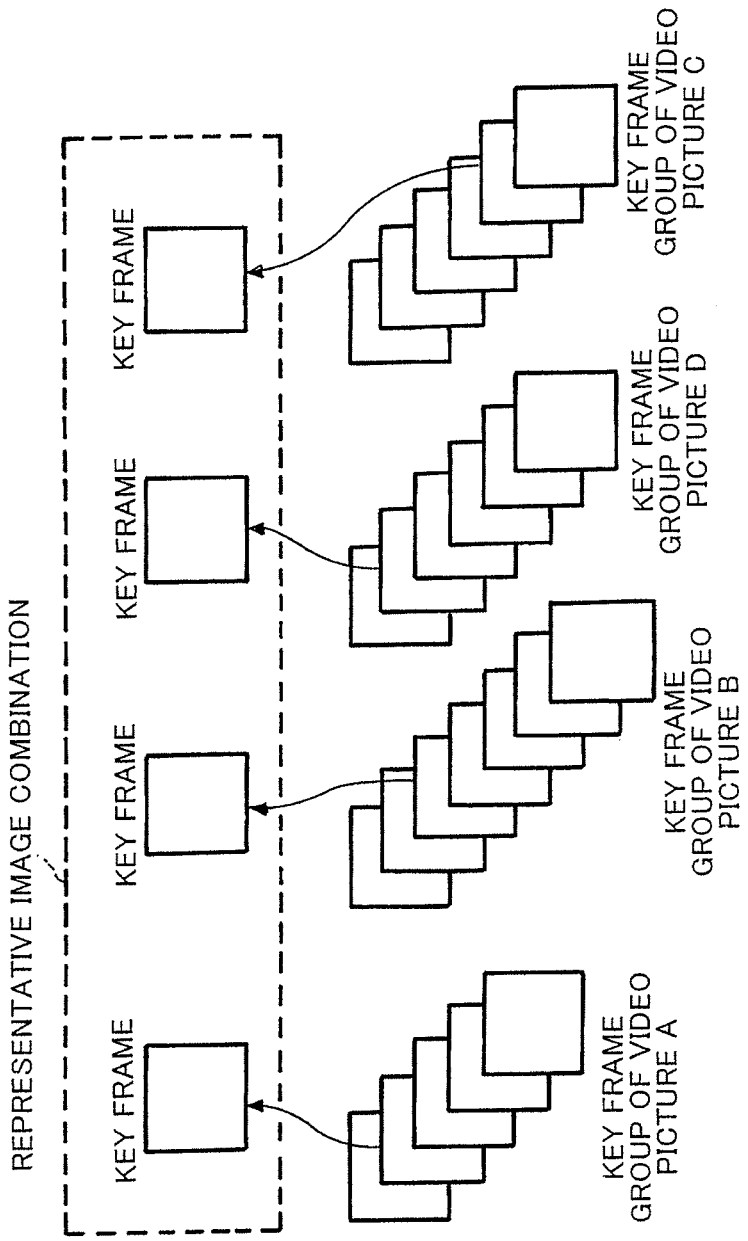
FIG. 2 is an explanatory diagram explaining operation performed if a key frame is extracted as a combination of representative images.

The representative image combination extractor 22 extracts one key frame from each video, i.e., n key frames from the respective videos in all as one representative image combination (that is, one key frame combination) if the number of videos for which a list of representative images is to be displayed (that is, videos designated by a user) is n and the number of $p^{th}$ key frames is $c_p$ ($1 \leq p \leq n$). FIG. 2 is an explanatory diagram explaining operation if key frames are extracted as one representative image combination. The number of representative image combinations extracted by the representative image combination extractor 22 is $c1 \times c2 \times \ldots \times cp \ldots \times cn$. All the representative image combinations may be extracted or only a part of representative image combinations may be extracted while a restriction condition is set.

Examples of the method of extracting only a part of representative image combinations while the restriction condition is set include a method of arranging all image combinations in order and extracting image combinations at certain intervals.

The evaluation value calculator 23 calculates a distribution state (variance or bias) of features of the entire key frames included in each of the representative image combinations extracted by the representative image combination extractor 22 as an evaluation value. For example, the evaluation value calculator 23 acquires features of the key frames from the key frame feature data storage unit 33, respectively, calculates the distance between the features of two out of the respective key frames, and calculates a sum of the distances, thereby calculating the evaluation value.

The evaluation value calculator 23 calculates one evaluation value for each of the representative image combinations. Accordingly, if the number of combinations extracted by the representative image combination extractor 22 is m, the evaluation value calculator 23 calculates m evaluation values.

The representative image combination selection mean 24 selects one representative image combination to be displayed as representative images from among the representative image combinations extracted by the representative image combination extractor 22 based on the evaluation values of the respective representative image combinations calculated by the evaluation value calculator 23.

As a selection method based on the evaluation value, for example, a combination having a maximum evaluation value is selected, a combination having a maximum frequency (a value indicating a highest ratio in light of constituent ratios in an evaluation value frequency distribution) or a combination having a minimum evaluation value is selected. In this way, the user can set a desired condition to the representative image combination selector 24 according to an object of the listing presentation by operating the input device 1. Further, the representative image combination selector 24 outputs key frames including the selected representative image combination and the bibliographic information on each of the videos selected by the video selector 21.

A CPU executing processings under program control may perform operations performed by the respective units included in the data processing device 2.

Specifically, a representative image displaying program for executing an evaluation value calculation processing for calculating the evaluation value of the combination of images representing each of designated videos and stored in the storage device 3 storing therein one or more images representing the respective videos, a representative image combination selection processing for selecting one image representing each of the designated videos from among the images stored in the storage device 3 based on the evaluation values calculated in the evaluation value calculation processing, and a display processing for causing the output device 4 to display the images selected in the representative image combination selection processing may be mounted in the data processing device 2.

Figure 3:
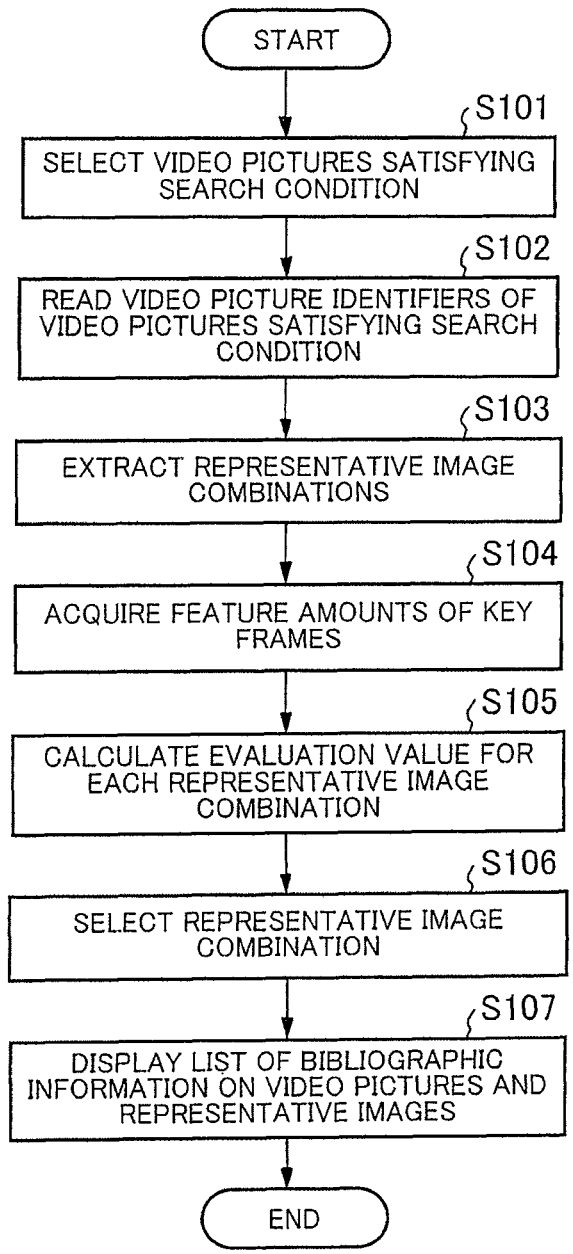
FIG. 3 is a flowchart explaining operation according to the first embodiment.

Operation according to the first embodiment will be described with reference to the drawings. FIG. 3 is a flowchart explaining the operation according to the first embodiment.

The input device 1 outputs the input search condition to the video selector 21. The video selector 21 searches the bibliographic information stored in the video data storage unit 32 and selects videos satisfying the input search condition (step S101).

If a keyword is input to the input device 1, for example, the video selector 21 checks whether or not the video data storage unit 32 stores bibliographic information including the same character (person or performer) string as that of the keyword.

If the video data storage unit 32 stores bibliographic information satisfying the search condition, the video selector 21 reads video identifiers of videos corresponding to the bibliographic information (step S102), and outputs the video identifiers to the representative image combination extractor 22.

The representative image combination extractor 22 identifies a group of key frames of the videos corresponding to the video identifiers output from the video selector 21, from the key frame storage unit 31. The representative image combination extractor 22 selects and extracts key frames to be displayed as representative images of the respective videos from the identified group of key frames (step S103).

A plurality of key frame selection methods are present. All combinations of key frames may be extracted as representative image combinations or only a part of combinations may be extracted as representative image combinations while setting a restriction condition. Examples of the method of extracting only a part of combinations as representative image combinations while setting a restriction condition include a method of arranging all combinations in order and extracting combinations at certain intervals.

The evaluation value calculator 23 acquires features of the key frames included in the respective representative image combinations from the key frame feature data storage unit 33 for all the representative image combinations (all the key frame combinations) extracted by the representative image combination extractor 22, and calculates the distribution state of the entire key frames (feature distribution state) as the evaluation value of each of the representative image combinations (steps S104 and S105).

A method of extracting a color feature of each key frame and a method of calculating a distance (an evaluation value) between the key frames are described in the Non-Patent Document 1. A method of extracting a shape feature is described in the Non-Patent Document 2. A cosine similarity used in a method of calculating a similarity between keywords or texts if features of two comparison target key frames are both text data is described in Chapter 3.2 of the Non-Patent Document 3.

The representative image combination selector 24 selects one representative image combination to be displayed from among the representative image combinations extracted by the representative image combination extractor 22 based on the evaluation values of the respective representative image combinations calculated by the evaluation value calculator 23 (step S106).

The representative image combination selector 24 outputs key frames of the respective videos included in the selected representative image combination and the bibliographic information on the respective videos selected by the video selector 21 to the output device 4. The output device 4 displays a list of the bibliographic information on the videos and the representative images (key frames) corresponding to the videos for every video (step S107).

As state so far, according to the first embodiment, the representative images to be displayed in the list are adaptively decided according to the distribution state of the features of the key frames of the respective videos. Due to this, the user can easily grasp contents of a plurality of videos and easily select a desired video.

Figure 4:
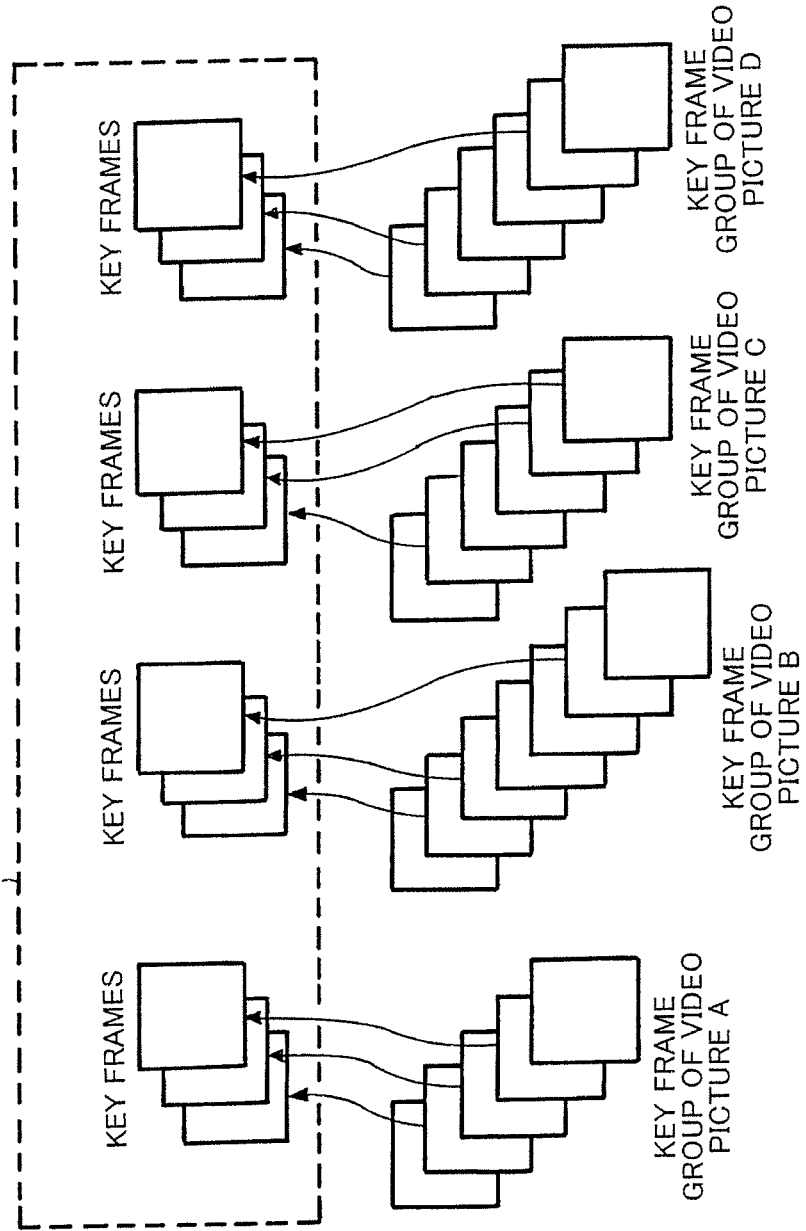
FIG. 4 is an explanatory diagram explaining an instance in which a plurality of key frames is extracted from one video as a combination of representative images.

In the first embodiment, one key frame is extracted from each of the videos (e.g., n videos), i.e., n key frames are extracted from the n videos in all as one representative image combination. Alternatively, a plurality of key frames may be extracted from each of the videos and displayed as one representative image combination. FIG. 4 is an explanatory diagram explaining an instance of extracting a plurality of key frames from one video as one representative image combination.

In another alternative, a plurality of key frames may be extracted for each video by repeating a procedure of extracting one key frame from each of the videos (e.g., n videos), i.e., n key frames from the n videos in all as one representative image combination a plurality of times.

Second Embodiment

Figure 5:
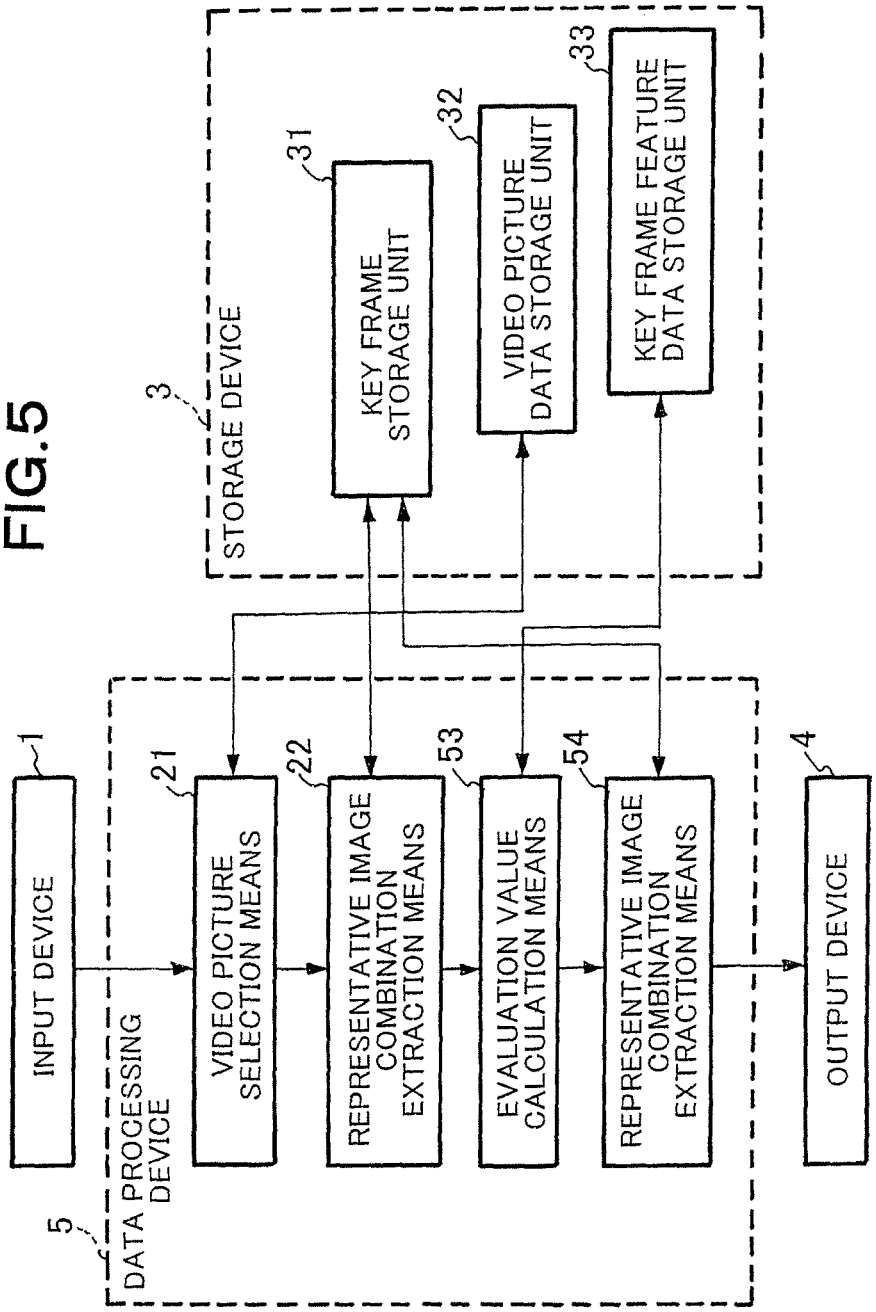
FIG. 5 is a block diagram showing an example of a configuration of a representative image display system according to a second embodiment.

A second embodiment of the present invention will be described with reference to the drawings. FIG. 5 is a block diagram showing an example of a configuration of a representative image display system according to the second embodiment of the present invention.

The second embodiment differs from the first embodiment in that a data processing device 5 includes an evaluation value calculator 53 in place of the evaluation value calculator 23 according to the first embodiment and a representative image combination selector 54 in place of the representative image combination selector 24 according to the first embodiment.

Since the second embodiment is similar in configuration to the first embodiment in the other respects, the other constituent elements are denoted by the same reference symbols as those shown in FIG. 1, respectively and will not be described herein.

The evaluation value calculator 53 calculates a sum of distances between each key frame and the other key frames included in each of representative image combinations extracted by the representative image combination extractor 22 as an evaluation value of each representative image combination. Namely, the evaluation value calculator 53 calculates a value indicating an evaluation as to how much a feature different from the other key frames each of the key frames included in each representative image combination has. The evaluation value calculator 53 acquires features of the respective key frames from the key frame storage unit 33 to use calculation of the evaluation value.

The representative image combination selector 54 selects a representative image combination having a maximum evaluation value among the evaluation values of the respective representative image combinations calculated by evaluation value calculator 53. Namely, the representative image combination selector 54 selects the combination (i.e., combination having the greatest difference among the key frames).

Figure 6:
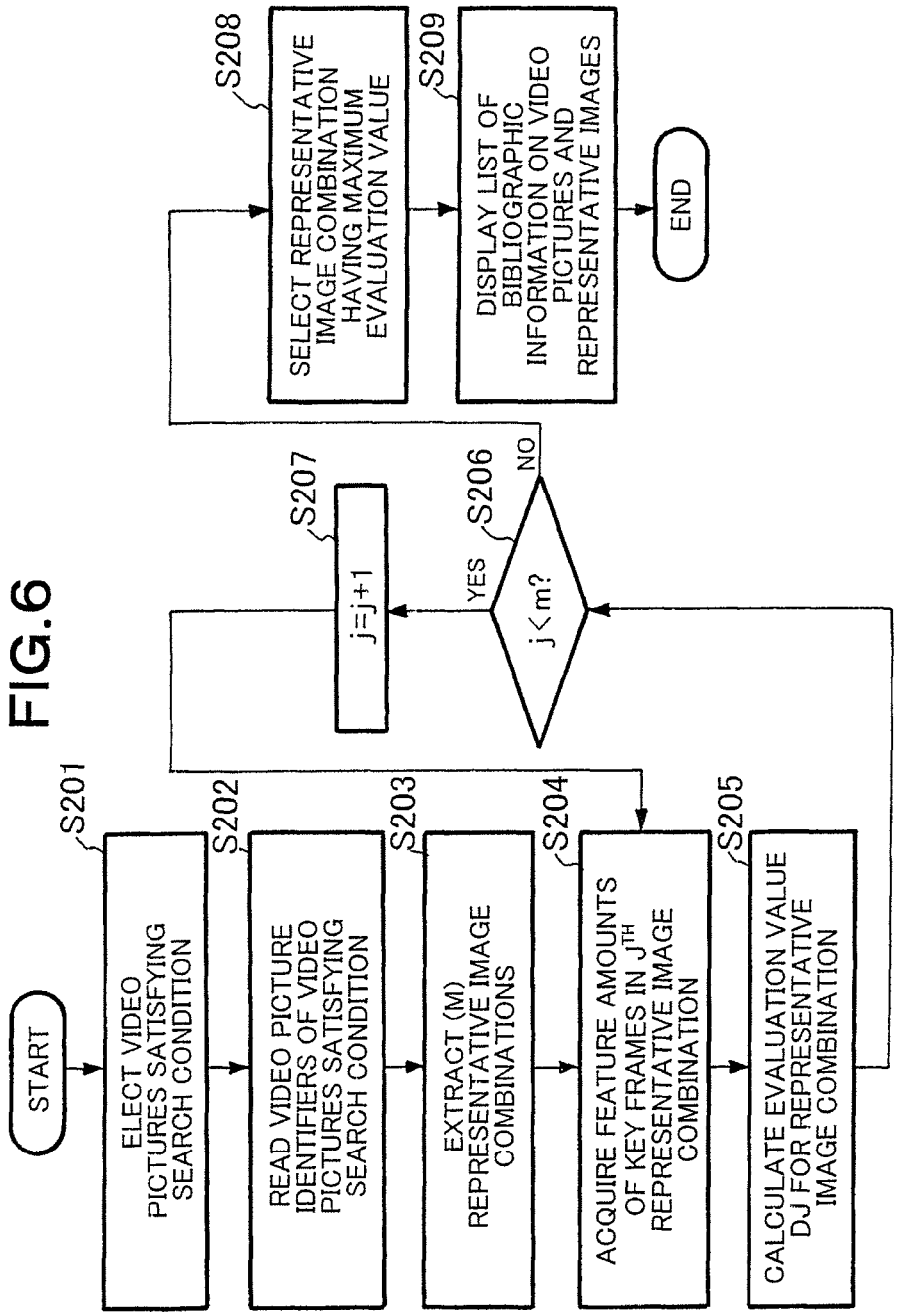
FIG. 6 is a flowchart explaining operation according to the second embodiment.

Operation according to the second embodiment will be described with reference to the drawings. FIG. 6 is a flowchart explaining the operation according to the second embodiment.

The input device 1 outputs an input search condition to the video selector 21. The video selector 21 searches bibliographic information stored in the video data storage unit 32 and selects videos satisfying the input search condition (step S201).

If the video data storage unit 32 stores bibliographic information satisfying the search condition, the video selector 21 reads video identifiers of videos corresponding to the bibliographic information, and outputs the video identifiers to the representative image combination extractor 22 (step S202).

The representative image combination extractor 22 selects a group of key frames of the videos corresponding to the video identifiers output from the video selector 21, from the key frame storage unit 31. The representative image combination extractor 22 selects and extracts key frames to be displayed as representative images of the respective videos one by one (step S203).

The evaluation value calculator 53 calculates a sum of distances between each key frame and the other key frames included in each of the representative image combinations (e.g., m representative image combinations) extracted by the representative image combination extractor 22 as the evaluation value of each of the representative image combinations.

Specifically, the evaluation value calculator 23 acquires features of the respective key frames for a $j^{th}$ ($1 \le j \le m$) representative image combination out of the m representative image combinations, from the key frame feature data storage unit 33 (step S204).

In this case, if n images to be displayed are present for one video, the evaluation value calculator 53 acquires features of n key frames. The evaluation value calculator 53 calculates distances between each of the feature frames and the other feature frames and calculates a sum of the distances as the evaluation value. One evaluation value is calculated for each of the representative image combinations. Specifically, the evaluation value calculator 53 calculates an evaluation value $D_j$ using the following Equation if the feature of each key frame is assumed as $x_k$ ($1 \le k \le n$) (Step S205).

$$D_j = \sum_{j=1}^{m}\sum_{k=1}^{n} |\vec{x}_j - \vec{x}_k|$$

The evaluation value calculator 53 calculates evaluation values for all of the m representative image combinations in similar procedures (steps S206 and S207).

The representative image combination selector 54 selects the representative image combination having the maximum evaluation value from among the representative image combinations extracted by the representative image combination extractor 22 based on the features of the respective representative image combinations calculated by the evaluation value calculator 53 (step S208).

The representative image combination selector 54 outputs the key frames of the videos included in the selected representative image combination and the bibliographical information on the respective videos selected by the video selector 21 to the output device 4. The output device 4 displays a list of the bibliographic information on the videos and the representative images (key frames) corresponding to the videos for every video (step S209).

As stated so far, according to the second embodiment, similarly to the first embodiment, the representative images to be displayed in the list are adaptively decided according to the distribution state of the features of the key frames of the respective videos from display target videos. Due to this, the user can easily grasp contents of a plurality of videos and easily select a desired video.

Furthermore, the sum of the distances between each key frame and the other key frames included in each representative image combination is used as the evaluation value of each representative image combination, and the representative image combination having the maximum evaluation value is selected as the representative image combination to be displayed. Therefore, the representative image combination in which the difference among the key frames is most emphasized can be selected. Due to this, by clarifying the difference among the videos from the list of representative images, the user can easily grasp contents of a plurality of videos and easily select a desired video.

In the second embodiment, similarly to the first embodiment, a plurality of key frames may be extracted from each of the videos as one representative image combination as shown in FIG. 4 instead f extracting one key frame from each of the videos (e.g., n videos), i.e., n key frames from the n videos in all.

Third Embodiment

A third embodiment of the present invention will be described with reference to the drawings. FIG. 7 is a block diagram showing an example of a configuration of a representative image display system according to the third embodiment of the present invention.

The third embodiment differs from the second embodiment in that a data processing device 6 includes a representative image combination extractor 62 in place of the representative image combination extractor 22 according to the second embodiment.

Since the third embodiment is similar in configuration to the second embodiment in the other respects, the other constituent elements are denoted by the same reference symbols as those shown in FIG. 5, respectively and will not be described herein.

The representative image combination extractor 62 selects video identifiers of videos that are selected by the video selector 21 based on bibliographic information stored in the video data storage unit 32 and that are considered to belong to a specific category.

Examples of videos in the specific category include videos identical in title and videos identical in genre.

The representative image combination extractor 62 identifies a group of key frames of the respective videos belonging to the specific category from the key frame storage unit 31 based on the video identifier selected by the representative image combination extractor 62. Further, the representative image combination extractor 62 selects and extracts key frames to be displayed as representative images common to the videos one by one from the identified group of key frames.

For example, if the specific category is a serial drama and a series of drama is to be displayed, the representative image combination extractor 62 selects and extracts images (key frames) including different characters (persons or performers) according to broadcasts as representative images. If news of the days is to be displayed, the representative image combination extractor 62 selects and extracts, for example, images (key frames) including different topics as images representing the respective news.

As stated so far, according to the third embodiment, similarly to the first embodiment, the representative images to be displayed in the list are adaptively decided according to the distribution state of the features of the key frames of the respective videos from display target videos. Due to this, the user can easily grasp contents of a plurality of videos and easily select a desired video.

Furthermore, if the representative image display system is configured so that the sum of the distances between each key frame and the other key frames included in each of the representative image combinations for the videos in the same category is used as the evaluation value of each representative image combination and so that the representative image combination having the maximum evaluation value is selected, it is possible to select the representative image combination in which the similarity among the key frames of the videos in the same category is most emphasized.

Due to this, by clarifying the difference among the videos belonging to the same category from the list of representative images, the user can easily grasp contents of a plurality of videos and easily select a desired video. This is particularly effective if a list of representative images of videos the contents of which are difficult to discern merely from their titles (e.g., a plurality of videos identical in title or identical in genre).

In the third embodiment, similarly to the first embodiment, a plurality of key frames may be extracted from each of the videos as one representative image combination as shown in FIG. 4 instead of extracting one key frame from each of the videos (e.g., n videos), i.e., n key frames from the n videos in all.

Fourth Embodiment

A fourth embodiment of the present invention will be described with reference to the drawings. FIG. 8 is a block diagram showing an example of a configuration of a representative image display system according to the fourth embodiment of the present invention.

The fourth embodiment differs from the third embodiment in that a data processing device 7 includes a representative image combination selector 74 in place of the representative image combination selector 54 according to the third embodiment.

Since the fourth embodiment is similar in configuration to the third embodiment in the other respects, the other constituent elements are denoted by the same reference symbols as those shown in FIG. 7, respectively and will not be described herein.

The representative image combination selector 74 selects a representative image combination having a minimum evaluation value among evaluation values of the respective representative image combinations calculated by the evaluation value calculator 53. Namely, the representative image combination in which similarities between each key frame and the other key frames included in each representative image combination are highest is selected, and the representative images for which similarities between each key frame and the other key frames are highest are displayed.

Alternatively, the representative image combination selector 74 may select one image from the representative images included in the representative image combination having the minimum evaluation value and output selected images for all the videos in the same category to the output device 4.

As stated so far, according to the fourth embodiment, similarly to the first embodiment, the representative images to be displayed in the list are adaptively decided according to the distribution state of the features of the entire key frames of the respective videos included in each representative image combination. Due to this, a list of representative images according to a desired feature distribution is displayed, and the user can easily grasp contents of a plurality of videos and easily select a desired video.

Furthermore, the sum of the distances between each key frame and the other key frames included in each of the representative image combinations is used as the evaluation value of each representative image combination and the representative image combination having the minimum evaluation value is selected. It is, therefore, possible to select the representative image combination in which the similarity among the key frames is most emphasized.

Due to this, if a list of representative images of many videos is displayed, representative images similar to one another are presented for the videos in the same category. Therefore, the user can easily locate videos belonging to a specific category by viewing the representative images, and easily search a desired video from the list of representative images.

Fifth Embodiment

A fifth embodiment of the present invention will be described with reference to the drawings. FIG. 9 is a block diagram showing an example of a configuration of a representative image display system according to the fifth embodiment of the present invention.

The fifth embodiment differs from the first embodiment in that a data processing device 8 includes a representative image group combination extractor 82 in place of the representative image combination extractor 22 according to the first embodiment, an evaluation value calculator 83 in place of the evaluation value calculator 23 according to the first embodiment, and a representative image group combination selector 84 in place of the representative image combination selector 24 according to the first embodiment.

Since the fifth embodiment is similar in configuration to the first embodiment in the other respects, the other constituent elements are denoted by the same reference symbols as those shown in FIG. 1, respectively and will not be described herein.

The representative image group combination extractor 82 identifies a group of key frames corresponding to video identifiers of videos selected by the video selector 21, from the key frame storage unit 31. Further, the representative image group combination extractor 82 selects and extracts key frames to be displayed as representative images of each video from the identified group of key frames.

In this case, if the number of videos the representative images of which are to be displayed is n and the number of key frames present in a $p^{th}$ video is cp ($1 \leq p \leq n$), the representative image group combination extractor 82 extracts d key frames from each video, i.e., n×d key frames in all from one representative image group combination.

The evaluation value calculator 83 calculates a distribution state of features of key frame groups constituting each of the representative image group combinations extracted by the representative image group combination extractor 83 for every video combination, thereby obtaining a first evaluation value.

Specifically, the evaluation value calculator 83 calculates, for example, an average value of Euclidean distances in an RGB space (that may be replaced by an HSV space or a Lab space) for each of all key frame combinations of one video, and sets the calculated average value as the first evaluation value of each key frame combination.

Calculation of the average value of Euclidean distances in the RGB space will be described. An average value of RGB values of all pixels included in the key frames of one video is calculated and the calculated average value is set as a feature of the key frames. Further, the Euclidean distances between the features in the RGB space are calculated for each of all the key frame combinations of one video.

Sums of the Euclidean distances calculated for all the key frame combinations of one video are calculated and the average value of the sums of the Euclidean distances is set as the first evaluation value.

For example, if the number of key frames in key frame groups constituting the representative image group combination of one video is Cp and the number of combinations of Cp key frames is b, a first evaluation value of a $q^{th}$ combination is assumed as V1(p, q).

If the first evaluation value is small, an average distance in the RGB space for the key frame combination (that is, representative image group combination) is short. Due to this, RGB colors are similar. In other words, the first evaluation value of the key frame combination (representative image group combination) the RGB colors of which are similar is small.

Next, the evaluation value calculator 83 calculates a feature distribution state between the representative image group combinations extracted by the representative image group combination extractor 83 for one video and those extracted by the representative image group combination extractor 83 for a different video as a second evaluation value.

Specifically, the evaluation value calculator 83 selects, for example, one first evaluation value per video for each of the representative image group combinations of each video and sets a sum of the first evaluation values as a second evaluation value V2.

Namely, the second evaluation value V2 is represented by an Equation of V2=V1(1, $q_1$)+V1(2, $q_2$)+ . . . +V1(n, $q_n$).

In the Equation, $q_m$ ($0<m \leq n$) is a certain key frame combination (representative image group combination) of an $m^{th}$ video.

If the second evaluation value is large, the distances between the features of the key frames of different videos in the RGB space are long. In other words, the second evaluation value of the key frame combination in which RGB colors greatly differ for each of the key frame combinations extracted from each video is large.

The representative image group combination selector 84 selects one representative image group combination to be displayed as representative image groups from among the representative image group combinations extracted by the representative image group combination extractor 82 based on the two types of evaluation values for the respective representative image group combinations calculated by the evaluation value calculator 83.

Examples of a selection method based on the evaluation values include a selection method of selecting a representative image group combination so that the sum of the first evaluation values indicating the distribution of the features of the key frames in the same video is as small as possible and so that the second evaluation value indicating the distribution of features among the videos is as large as possible.

Specifically, the representative image group selector 84 selects, for example, a representative image group combination having a maximum quotient obtained by dividing the second evaluation value by the first evaluation value. Namely, the representative image group selector 84 selects the key frame combination (representative image group combination) for which V2/V1 is the maximum value.

For example, if each evaluation value is calculated using color features of the respective key frames, the representative image group selector 84 selects the representative image group combination in which colors of key frames selected from within the same video are similar and, at the same time, a color difference from the other videos is most emphasized.

Further, the representative image group selector 84 outputs key frame groups included in the selected representative image group combination and bibliographic information on the respective videos selected by the video selector 21 to the output device 4.

A CPU executing processings under program control may perform operations performed by the respective units included in the data processing device 8.

Specifically, a representative image display program causing a computer to execute an evaluation value calculation processing for calculating the evaluation values of the combination of images representing each of designated videos and stored in the storage device 3 storing therein a plurality of images representing the respective videos, a representative image group combination selection processing for selecting a plurality of images representing each of the designated videos from among the images stored in the storage device 3 based on the evaluation values calculated in the evaluation value calculation processing, and a display processing for causing display units to display the images selected in the representative image group combination selection processing may be mounted in the data processing device 8.

Operation according to the fifth embodiment will be described with reference to the drawings. FIG. 10 is a flowchart explaining the operation according to the fifth embodiment.

The input device 1 outputs an input search condition to the video selector 21. The video selector 21 searches the bibliographic information stored in the video data storage unit 32 and selects videos satisfying the input search condition (step S501).

If the video data storage unit 32 stores bibliographic information satisfying the search condition, the video selector 21 reads video identifiers of videos corresponding to the bibliographic information (step S502), and outputs the video identifiers to the representative image combination extractor 82.

The representative image group combination extractor 82 identifies a group of key frames of the videos corresponding to the video identifiers output from the video selector 21, from the key frame storage unit 31. The representative image group combination extractor 82 selects and extracts k key frames to be displayed as representative images of each of the videos from the identified group of key frames (step S503).

A plurality of key frame group selection methods are present. All combinations of key frames may be extracted as representative image combinations or only a part of combinations may be extracted as representative image group combinations while setting a restriction condition. Examples of the method of extracting only a part of combinations as representative image group combinations while setting a restriction condition include a method of arranging all combinations in order and extracting combinations at certain intervals.

The evaluation value calculator 83 acquires features of the key frames included in each of all the respective representative image combinations extracted by the representative image group combination extractor 82 from the key frame feature data storage unit 33 (step S504).

The evaluation value calculator 83 calculates the distribution state of the features of the key frame groups for each of the representative image group combinations extracted by the representative image group extractor 82 for every video and obtains, for example, b first evaluation values (step S505). Furthermore, the evaluation value calculator 83 calculates the second evaluation value as the distribution state of the features of the key frame groups of different videos based on the first evaluation values (step S506).

The representative image group combination selector 84 selects one representative image group combination used as representative image groups to be displayed from among the representative image group combinations extracted by the representative image group combination extractor 82 based on the two type of evaluation values of the respective representative image group combinations calculated by the evaluation value calculator 83 (step S507).

Examples of a selection method based on the evaluation values include a selection method of selecting a representative image group combination so that the sum of the first evaluation values indicating the distribution of the feature of the key frames in the same video is as small as possible and so that the second evaluation value indicating the distribution of the videos is as large as possible. For example, if the evaluation values are calculated using color features of the respective key frames, the representative image group selector 84 selects the representative image group combination in which colors of key frames selected from within the same video are similar and, at the same time, a color difference from the other videos is most emphasized.

Moreover, a distinction among the representative image groups may be clearly displayed by, for example, setting an evaluation method so as to emphasize only differences between a certain representative image group and representative image groups of videos present before and after the certain representative image group when a list of representative image groups is displayed.

Specifically, examples of a second evaluation value calculation method include a second evaluation value calculation method by calculating a sum of a difference between the first evaluation value of one representative image group of an $i^{th}$ video and the first evaluation value of one representative image group of an $i-1^{th}$ video and a difference between the first evaluation value of the one representative image group of the $i^{th}$ video and the first evaluation value of one representative image group of an $i+1^{th}$ video for the $i^{th}$ video, and setting a calculation result as the second evaluation value of the representative image group of the $i^{th}$ video.

The second evaluation values of all the representative image groups of all the videos are calculated by a similar method. The representative image group having the maximum evaluation value is selected as the representative image group of each video.

If the representative image group is selected by such a method and a list of representative image groups is displayed, then the difference between the representative image group of a certain video and the representative image groups of the videos before and after the certain video increases, and the differences between the adjacent videos can be emphasized at the time of displaying the list. Namely, the output device 4 can display an image having great differences from the adjacent images.

The representative image group combination selector 84 outputs key frames of the respective videos included in the selected representative image group combination and the bibliographic information on the respective videos selected by the video selector 21 to the output device 4. The output device 4 displays a list of the bibliographic information on the videos and the representative images (key frames) of the videos for every video (step S508).

As state so far, according to the fifth embodiment, the representative image groups to be displayed in the list are adaptively decided according to the distribution state of the features of the key frames included in the respective representative image group combinations. Due to this, a list of representative images according to a feature distribution desired by the user is displayed, and the user can easily grasp contents of a plurality of videos and easily select a desired video.

Moreover, the representative image group combination can be selected so that the similarity among the key frames is most emphasized by selecting the key frame combination (representative image group combination) for which the evaluation values (first evaluation values) of the key frames in each of the key frame groups included in the representative image group combination are the minimum, and so that the difference among the videos is most emphasized by using the sum of the distances of each key frame and the other key frames of each video as the evaluation value (second evaluation value). Due to this, if a list of representative images of many videos is displayed, representative images similar to one another (having high similarity) are presented. This can facilitate locating videos belonging to a specific category and the user can easily search a desired video from the list of representative image groups.

INDUSTRIAL APPLICABILITY

The present invention can be applied to a system and a program for displaying representative images so that a user can easily grasp contents of videos displayed in a list to support the user who is to grasp contents of a video group recorded in a recording media and to select and search a desired video. Specifically, the present invention can be applied to display of a list of videos stored in a hard disk recorder, a home server, a personal computer, a portable telephone, a DVD (a registered trademark) or the like. The present invention can be also applied to display of a list of videos included in a recording media of a server by accessing a recorder such as the server from a personal computer, a portable telephone or the like via a communication network such as the Internet. Moreover, it is effective to adaptively select representative images for a small-screen device such as a portable telephone because of a restricted display region.

The invention claimed is:

1. A representative image display system comprising:
   an evaluation value calculator which calculates a plurality of evaluation values, each of which corresponds to one of a plurality of different combinations of one or more representative images representing each of videos in a video group displayed in a list for each of videos, according to predetermined evaluation standards;
   a representative image combination selector which selects one evaluation value from said plurality of evaluation values and selects the combination of the representative images, said combination corresponding to the selected evaluation value, from said plurality of different combinations of the representative images displayed in the list based on mutual comparison of said plurality of evaluation values, the selected evaluation value being selected when using once the selection standard chosen from a plurality of selection standards based on a user's desire; and
   a display controller which displays the combination of the images selected by the representative image combination selector.

2. A representative image selection system comprising:
   an evaluation value calculator which calculates a plurality of evaluation values, each of which corresponds to one of a plurality of different combinations of one or more representative images representing each of videos in a video group displayed in a list for each of videos, according to predetermined evaluation standards; and
   a representative image combination selector which selects one evaluation value from said plurality of evaluation values and selects the combination of the representative images, said combination corresponding to the selected evaluation value, from said plurality of different combinations of the representative images displayed in the list based on mutual comparison of said plurality of evaluation values, the selected evaluation value being selected when using once the selection standard chosen from a plurality of selection standards based on a user's desire.

3. The representative image selection device according to claim 2,
   wherein the representative image combination selector selects a combination of the representative images based on a selection standard so that the evaluation value of the combination of the representative images is a minimum value.

4. The representative image selection device according to claim 2,
   wherein the representative image combination selector selects a combination of the representative images based on a selection standard so that the evaluation value of the combination of the representative images is a maximum value.

5. The representative image selection device according to claim 2,
   wherein the evaluation value calculator calculates the evaluation value based on features of the representative images.

6. A representative image selection method comprising:
   an evaluation value calculation step wherein an evaluation value calculator calculates a plurality of evaluation values, each of which corresponds to one of a plurality of different combinations of one or more representative images representing each of videos in a video group displayed in a list for each of videos, according to predetermined evaluation standards; and
   a representative image combination selection step wherein a representative image combination selector selects one evaluation value from said plurality of evaluation values and selects the combination of the representative images, said combination corresponding to the selected evaluation value, from said plurality of different combinations of the representative images displayed in the list based on mutual comparison of said plurality of evaluation values, the selected evaluation value being selected when using once the selection standard chosen from a plurality of selection standards based on a user's desire.

7. The representative image selection method according to claim 6,
   wherein in the representative image combination selection step, a combination of the representative images based on a selection standard so that the evaluation value of the combination of the representative images is a minimum value is selected.

8. The representative image selection method according to claim 6,
   wherein in the representative image combination selection step, a combination of the representative images based on a selection standard so that the evaluation value of the combination of the representative images is a maximum value is selected.

9. The representative image selection method according to claim 6,
   wherein in the evaluation value calculation step, the evaluation value is calculated based on features of the representative images.

10. A computer program product for causing a computer to function as a representative image selection system comprising:
    an evaluation value calculator which calculates a plurality of evaluation values, each of which corresponds to one of a plurality of different combinations of one or more representative images representing each of videos in a video group displayed in a list for each of videos, according to predetermined evaluation standards; and
    a representative image combination selector which selects one evaluation value from said plurality of evaluation values and selects the combination of the representative images which corresponds to the selected evaluation value, from said plurality of different combinations of the representative images displayed in the list based on mutual comparison of said plurality of evaluation values, the selected evaluation value being selected when using once the selection standard chosen from a plurality of selection standards based on a user's desire.

11. The computer program product according to claim 10, wherein the representative image combination selector selects a combination of the representative images based on a selection standard so that the evaluation value of the combination of the representative images is a minimum value.

12. The computer program product according to claim 10, wherein the representative image combination selector selects a combination of the representative images based on a selection standard so that the evaluation value of the combination of the representative images is a maximum value.

13. The computer program product according to claim 10, wherein the evaluation value calculator calculates the evaluation value based on features of the representative images.

\* \* \* \* \*